3,489,517
Patented Jan. 13, 1970

3,489,517
PROCESS FOR PREPARING DECABORANE-14 AND HEXABORANE-10
Sheldon G. Shore and Russell A. Geanangel, Columbus, Ohio, assignors to The Ohio State University Research Foundation, Columbus, Ohio, a corporation of Ohio
No Drawing. Filed Dec. 13, 1967, Ser. No. 690,063
Int. Cl. C01b 6/08
U.S. Cl. 23—204
8 Claims

ABSTRACT OF THE DISCLOSURE

Process for producing decaborane-14 ($B_{10}H_{14}$) or hexaborane-10 ($B_6H_{10}$) by reaction of diborane ($B_2H_6$) and an alkali metal pentaborane-8 ($MB_5H_8$, wherein M=alkali metal) in an ether solvent.

---

The invention described herein was made in the course of or under a grant from the National Science Foundation, an agency of the United States Government.

BRIEF DESCRIPTION OF THE INVENTION

The present invention relates to the preparation of decaborane-14 by the reaction of diborane and an alkali metal pentaborane-8 in an ether solvent.

BACKGROUND OF THE INVENTION

Decaborane-14 is probably the most thoroughly investigated and one of the most useful boron hydrides known. Its rich and varied chemistry spans the gap between organic and inorganic studies. Unfortunately methods of preparation of this interesting compound are restricted to pyrolytic or high pressure reactions involving one or more of the lower boron hydrides. [See: General Electric Co. Report No. 55248 (Mar. 20, 1950), A. E. Stock, "Hydrides of Boron and Silicon," Cornell Univ. Press, Ithaca, N.Y., 1933; W. De Acetis and S. I. Trotz, U.S. Patent 2,983,581 (Dec. 5, 1956); J. P. Faust and N. Goodspeed, U.S. Patent 2,987,377 (June 6, 1961); G. F. Judd, U.S. Patent 2,968,534 (Jan. 14, 1961); and J. A. Neff, U.S. Patent 2,989,374 (June 20, 1961).] Such preparative methods are difficult, uneconomic, and leave much to be desired in practical operation.

The process described herein is a considerable improvement over previously available methods of preparation of $B_{10}H_{14}$ in several ways. Since it does not involve pyrolysis routes, it has none of the difficulties associated with such routes. The present route also has greater scale-up potential than pyrolysis methods. Finally, production of decarborane-14 in the present manner takes advantage of the fact that large quantities of pentaborane-9 along with facilities for its production are already in existence, pentaborane-9 being used in the preparation of the starting alkali metal pentaborane-8, as will be realized.

The mechanism by which decaborane-14 is formed in this reaction is, as yet, unknown, and its formation from diborane and an alkali metal pentaborane-8 could not have been predicted previous to our investigation and discovery or invention of the present process.

It is accordingly an object of the present invention to provide a new and improved process for the production of decaborane-14. An additional object involves provision of such a process which employs as starting materials diborane and an alkali metal pentaborane-8. Further objects will become apparent hereinafter and still others will be apparent to one skilled in the art to which this invention pertains.

GENERAL PROCEDURE

Decaborane-14 may be prepared by reaction of any of the alkali metal (Li, Na, K) $B_5H_8$ salts (i.e., an alkali metal pentaborane-8) with diborane in an alkyl ether ($R_2O$) solvent including diethyl ether, glyme (1,2-dimethoxyethane) and diglyme [bis(2 - methoxyethyl) ether]. Completion of the reaction is indicated when hydrogen evolution ceases. Other solvents include the simple ethers, the cyclic ethers, and the higher ethers, dilower- and dihigher-alkyl ethers, tetrahydropyran, and the like. Especially preferred are diethyl ether, glyme, and diglyme, and generally the Ansul (TM) Series of alkoxyalkyl ethers, such as Ansul 121 ($CH_3OCH_2CH_2OCH_3$), 141 [$CH_3(OCH_2CH_2)_2OCH_3$], 161

[$CH_3(OCH_2CH_2)_3OCH_3$]

and 181 [$CH_3(OCH_2CH_2)_4OCH_3$].

In preparing $B_{10}H_{14}$, the $MB_5H_8$ (M=Li, Na, K) in substantially anhydrous ether solution is allowed to come into contact with diborane, preferably an equimolar quantity of diborane. This may be effected in any convenient manner, e.g., by simple condensation of the gas into the reaction vessel, adding the correct quantity in ether solution, or by generating the diborane by standard methods in situ. The reaction is allowed to proceed at a temperature not greater than about $-20°$ C., preferably about $-20$ to $-80°$ C., until the $B_2H_6$ has been absorbed and is then allowed to warm to room temperature. Production of decaborane-14 is enhanced by adequate mixing, so stirring for a few hours up to lengthy periods of stirring at ambient temperature and refluxing of the reaction mixture at the reflux temperature of the solvent employed at this point are preferred modes of operation. Temperatures of up to $90°$ C. have been employed for reflux in some cases with no untoward effect.

The decaborane-14 may be recoverd from the reaction mixture in any convenient manner. The decaborane-14 is most readily recovered by sublimation in vacuo after the more volatile components, which may comprise unreacted starting materials and volatile by-products, have been distilled out. Alternately, it can be recovered from the syrupy residue (remaining after pumping away components which are volatile at ambient temperature) by extracting with solvents such as benzene or carbon disulfide. $B_{10}H_{14}$ is easily purified in crystalline form by repeated sublimation in vacuo or by heating above its sublimation point at the pressure employed.

We have found that production of $B_{10}H_{14}$ does not depend on the presence of excess $B_2H_6$, which can be recovered unchanged during product recovery. The stoichiometry of the $MB_5H_8$—$B_2H_6$ reaction was established through tensiometric titration whereby small increments of $B_2H_6$ were added to $MB_5H_8$ solutions and allowed to be absorbed. The results were that all $B_2H_6$ was absorbed until the 1:1 equivalence point was reached and then no more was taken up at $-78°$ C. Any excess could be essentially completely recovered. Therefore, less than equimolar quantities of diborane result in less than optimum yields, equimolar quantities in optimum yields, and any excess over equimolar amounts does not react and may be recovered.

SPECIFIC EMBODIMENTS OF THE INVENTION

The following preparation and example are given to illustrate the process of the present invention, but are not to be construed as limiting.

Preparation of representative alkali metal pentaborane-8 starting material, $NaB_5H_8$ (sodium pentaborane-8)

A typical preparation is given below. For additional preparations of alkali metal pentaborane-8, and details concerning the same, see our copending application Ser. No. 690,064, filed Dec. 13, 1967. The reaction temperature is generally $-20°$ C. or less in any event.

A known quantity (.156 g., 6.5 mmoles) of sodium hydride (NaH) was placed in a reaction vessel along with about 20 ml. of glyme (1,2-dimethoxyethane). The vessel and contents were frozen and evacuated and 6.5 mmoles of pentaborane-9 ($B_5H_9$) were distilled in. The reaction mixture was warmed briefly to about $-40°$ C. and then allowed to stir for about 12 hours at $-78°$ C. until further pressure increase ceased. The reaction proceeds according to the equation shown below.

$$NaH + B_5H_9 \xrightarrow{glyme} NaB_5H_8 \text{ (solvate)} + H_2$$

Potassium pentaborane-8 ($KB_5H_8$) is prepared in the same manner, starting with potassium hydride (KH) instead of sodium hydride (NaH).

The starting $LiB_5H_8$ solution is most readily prepared through reaction of a quantity of methyl lithium ($CH_3Li$) or other lithium alkyl, dissolved in diethyl or other suitable ether, again with an equivalent amount of pentaborane-9, at a temperature preferably below $-30°$ C. Completion of the reaction in this case is noted by the cessation of methane evolution.

Example—Preparation of decaborane-14

Without allowing the reaction mixture to warm above about $-30°$ C., the hydrogen evolved was pumped away. Then 6.5 mmoles of diborane were condensed into the flask and allowed to be absorbed into the stirred $NaB_5H_8$ (or other alkali metal pentaborane-8) solution at $-78°$ C. When the $B_2H_6$ had been absorbed, which required about one hour, the reaction mixture was allowed to warm slowly to ambient temperature over a period of about one further hour. The closed vessel was then stirred continuously for seven days at ambient temperature. At the end of this time the volatile materials were separated by fractional condensation in consecutive traps cooled to $-45°$, $-78°$, and $-196°$ C. About 4 mmoles of gas, presumably $H_2$, passed all the traps, and solvent, along with some $B_2H_6$ and $B_6H_{10}$ (which in one form or another may be an intermediate in the reaction), were found in the $-78°$ and $-196°$ traps. The $45°$ C. trap was found to contain $B_{10}H_{14}$ in 25% yield based on $B_5H_9$ used. The $B_{10}H_{14}$ was measured by subliming into a previously weighed tube which was then removed from the vacuum line and reweighed. Decaborane was positively identified by its melting point ($100°$ C.) and by comparison of its X-ray powder pattern with that of an authentic sample.

The same result is produced when $LiB_5H_8$ or $KB_5H_8$ are substituted for $NaB_5H_8$ in the previous example.

As shown in the example, production of hexaborane-10, if desired, is accomplished by vacuum distilling the reaction mixture substantially immediately upon reaching room temperature without prolonged stirring at room temperature or heating (hexaborane-10 decomposes slowly at $25°$ C.). Separation of the hexaborane-10 from the more volatile ether solvent any less volatile by-products can be achieved by fractional condensation in vacuo into traps at $-78°$, $-96°$, and $-196°$ C. Ultimately the $-96°$ trap contains fairly pure hexaborane-10, the $-196°$ trap contains solvent, and the $-78°$ trap contains low volatility by-products such as decaborane-14. Alternately, hexaborane-10 may be separated from the reaction components and purified by application of suitable gas phase chromatographic procedures.

Various substitutions and equivalents will immediately be apparent to one skilled in the art, and it is therefore to be understood that the invention is not restricted to the exact compounds, compositions, procedure, or reaction conditions disclosed, but is only to be limited by the full scope of the appended claims, including application thereto of the doctrine of equivalents.

We claim:

1. A process for the production of decaborane-14 which comprises the steps of (1) reacting together an alkali metal pentaborane-8 and diborane in a substantially anhydrous ether solvent at a temperature not greater than about $-20°$ C., (2) elevating the temperature of the reaction mixture to between about room temperature and the reflux temperature of the solvent employed and effecting adequate mixing at said elevated temperature, (3) removing volatile materials from the reaction mixture, and (4) recovering the desired decaborane-14 from the reaction mixture.

2. The process of claim 1 wherein the diborane is employed in at least an equimolar quantity and the initial reaction temperature in step (1) is between about $-20°$ C. and $-80°$ C.

3. The process of claim 1 wherein in step (2) the temperature of the reaction is elevated to between about room temperature and about $90°$ C. and mixing is effected by stirring or refluxing.

4. The process of claim 1 wherein in step (3) the volatile materials are removed by distillation and in step (4) the decaborane-14 is recovered from the reaction mixture by sublimation.

5. The process of claim 4 wherein both distillation and sublimation are effected in vacuo.

6. The process of claim 1 wherein the substantially anhydrous ether solvent is selected from the group consisting of diethyl ether, glyme, and diglyme.

7. The process of claim 1 wherein the starting alkali metal pentaborane-8 is prepared in situ in the ether solvent by reaction of pentaborane-9 and an alkali metal hydride or lithium alkyl at a temperature not greater than about $-20°$ C. and wherein the alkali metal pentaborane-8 in its ether reaction solvent is used directly for reaction with diborane in step (1) of the process.

8. A process for the production of hexaborane-10 which comprises the steps of (1) reacting together an alkali metal pentaborane-8 and diborane in a substantially anhydrous ether solvent at a temperature not greater than about $-20°$ C., (2) elevating the temperature of the reaction mixture to about room temperature and vacuum distilling the reaction mixture substantially immediately upon reaching room temperature without prolonged stirring or heating, to remove volatile components from the reaction mixture, and (3) recovering the desired hexaborane-10 from the other volatile components.

References Cited

UNITED STATES PATENTS

| | | | |
|---|---|---|---|
| 2,968,534 | 1/1961 | Judd | 23—204 |
| 2,983,581 | 5/1961 | De Acetis | 23—204 |

OTHER REFERENCES

Gaines, D. F. et al. "Journal of the American Chemical Society," vol. 89, June 21, 1967, pages 3375–6.

OSCAR R. VERTIZ, Primary Examiner

G. O. PETERS, Assistant Examiner